US009823932B2

(12) United States Patent
Bouzguarrou

(10) Patent No.: US 9,823,932 B2
(45) Date of Patent: Nov. 21, 2017

(54) BRANCH PREDICTION

(71) Applicant: ARM LIMITED, Cambridge (GB)

(72) Inventor: Houdhaifa Bouzguarrou, Le Paros (FR)

(73) Assignee: ARM Limited, Cambridge (GB)

( * ) Notice: Subject to any disclaimer, the term of this patent is extended or adjusted under 35 U.S.C. 154(b) by 248 days.

(21) Appl. No.: 14/690,603

(22) Filed: Apr. 20, 2015

(65) Prior Publication Data

US 2016/0306632 A1    Oct. 20, 2016

(51) Int. Cl.
*G06F 9/38* (2006.01)

(52) U.S. Cl.
CPC .................................. *G06F 9/3848* (2013.01)

(58) Field of Classification Search
None
See application file for complete search history.

(56) References Cited

U.S. PATENT DOCUMENTS

| | | | | |
|---|---|---|---|---|
| 5,577,217 A * | 11/1996 | Hoyt | ..................... | G06F 9/3848 711/140 |
| 5,835,754 A * | 11/1998 | Nakanishi | ............. | G06F 9/3844 712/239 |
| 5,974,542 A * | 10/1999 | Tran | ..................... | G06F 9/3844 712/239 |
| 6,122,709 A * | 9/2000 | Wicki | ................. | G06F 12/0895 711/118 |
| 6,185,675 B1 * | 2/2001 | Kranich | ................ | G06F 9/3804 711/125 |
| 6,854,050 B1 * | 2/2005 | Zuraski, Jr. | ........... | G06F 9/3844 712/239 |
| 7,055,023 B2 * | 5/2006 | Tago | ..................... | G06F 9/3848 712/240 |
| 7,962,733 B2 * | 6/2011 | Cypher | ................. | G06F 9/3846 712/239 |
| 9,563,430 B2 * | 2/2017 | Bonanno | ............. | G06F 9/30058 |
| 2002/0194462 A1 * | 12/2002 | Henry | ................... | G06F 9/3017 712/238 |
| 2003/0236969 A1 * | 12/2003 | Kacevas | ............... | G06F 9/3848 712/239 |
| 2006/0218385 A1 * | 9/2006 | Smith | .................. | G06F 9/3806 712/238 |

* cited by examiner

*Primary Examiner* — Eric Coleman
(74) *Attorney, Agent, or Firm* — Nixon & Vanderhye, P.C.

(57) ABSTRACT

A tagged geometric length (TAGE) branch predictor incorporates multiple prediction tables. Each of these prediction tables has prediction storage lines which store a common stored TAG value and a plurality of branch predictions in respect of different offset positions within a block of program instructions read in parallel. Each of the branch prediction has an associated validity indicator. Update of predictions stored may be made by a partial allocation mechanism in which a TAG match occurs and a branch storage line is partially overwritten or by full allocation in which no already matching TAG victim storage line can be identified and instead a whole prediction storage line is cleared and the new prediction stored therein.

15 Claims, 5 Drawing Sheets

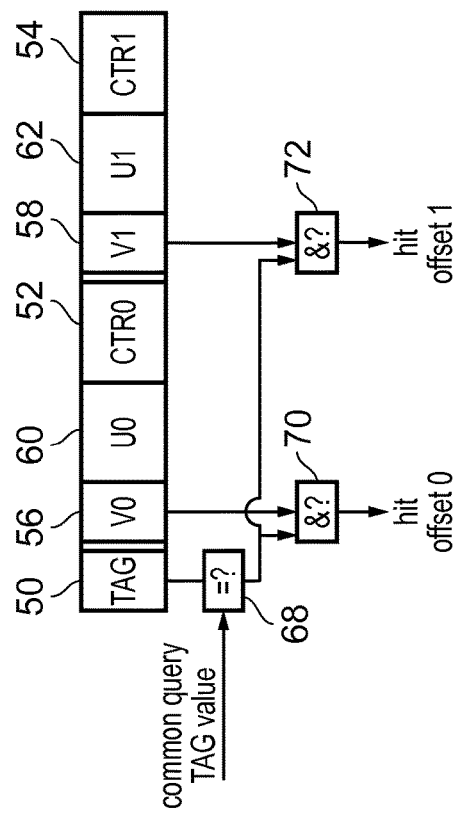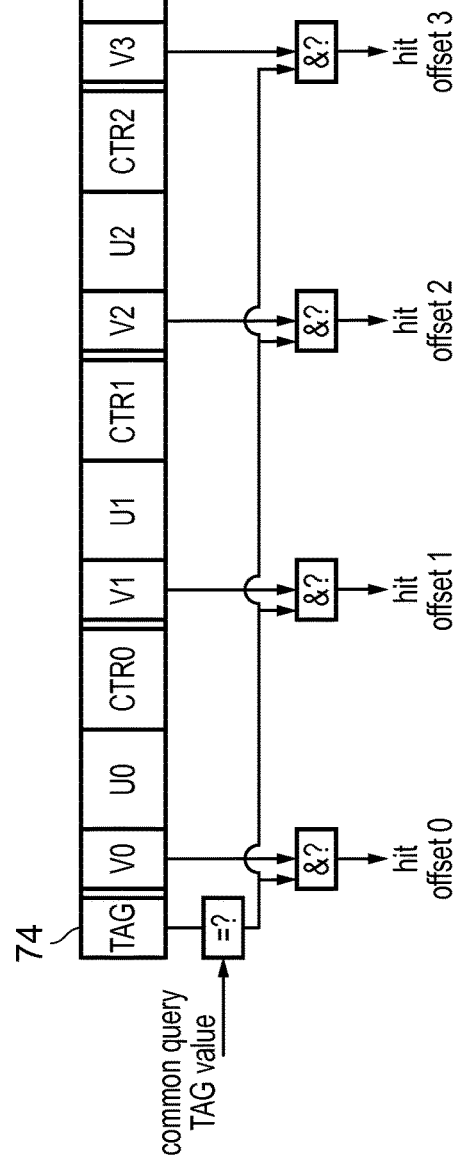

Prediction Read

Fetch pc[N:3]=0xAA

Tag hit | Tag hit offset 1 = Tag hit & valid | Tag hit offset 2 = Tag hit & valid

| | | | | | | | | | | | | | |
|---|---|---|---|---|---|---|---|---|---|---|---|---|---|
| T0 | | | TK | | | TK | | | | TK | | | TK |
| T1 | 0xAA | 1 | 0 | TK | 0 | 0 | NTK | 1 | 1 | TK | | 0 | |
| T2 | 0xAA | 1 | 0 | NTK | 1 | 0 | TK | 1 | 1 | NTK | | 1 | TK |
| T3 | 0xAA | 1 | 0 | TK | 0 | 0 | TK | 1 | 0 | | | 1 | |
| T4 | 0xBB | 0 | 0 | TK | 0 | 0 | NTK | 0 | 0 | | | 0 | |
| T5 | 0xAA | 0 | 0 | TK | 1 | 0 | NTK | 1 | 0 | | | 1 | NTK |
| | Tag | V | U | CTR | V | U | CTR | | | | | | |

FIG. 6

Partial Allocation

Update info: Fetch pc[N:3]= 0xAA offset 2 mispred    Potential victim offset 2

| | | | | | | | | | |
|---|---|---|---|---|---|---|---|---|---|
| T0 | | | TK | | | TK | | | |
| T1 | 0xAA | 1 | 0 | TK | 0 | 0 | NTK | | 0 |
| T2 | 0xAA | 1 | 0 | NTK | 1 | 0 | TK | | 0 |
| T3 | 0xAA | 1 | 0 | TK | 0 | 0 | TK | | 1 | ← Same tag -> partial allocation
| T4 | 0xBB | 0 | 0 | TK | 0 | 0 | NTK | | 1 |
| T5 | 0xCC | 0 | 0 | TK | 0 | 0 | NTK | | 1 |

FIG. 7

Full Allocation

Allocate info: Fetch pc[N:3]= 0xAA offset 2 NTK

| | | | | | | | |
|---|---|---|---|---|---|---|---|
| T3 | 0xBB | 1 | 0 | TK | 1 | 0 | TK |

↓

| | | | | | | | |
|---|---|---|---|---|---|---|---|
| T3 | 0xAA | 0 | 0 | TK | 1 | 0 | NTK |

FIG. 8

BRANCH PREDICTION

BACKGROUND

Field

This disclosure relates to the field of data processing systems. More particularly, this disclosure relates to branch prediction of program instruction flow within data processing systems.

Description

It is known to provide data processing systems including branch prediction mechanisms. Correctly predicting the behavior of branch instructions is beneficial in enabling less interruption to processing, and other inefficiencies, such as fetching the wrong instructions from memory, partially executing the wrong instructions requiring pipeline flushes, and the like.

SUMMARY

Viewed from one aspect the present disclosure provides branch prediction apparatus comprising:

tag generation circuitry to generate one or more common query tag values, a common query tag value corresponding a block of a plurality of instructions read in parallel, different instructions within said block having respective offset positions within said block; and prediction storage circuitry comprising a plurality of prediction storage lines, a prediction storage line having storage for:

a common stored tag value; a plurality of branch predictions in respect of different offset positions associated with said common stored tag value; and a plurality of validity indicators associated with said plurality of branch predictions.

Viewed from another aspect the present disclosure provides branch prediction apparatus comprising:

tag generation means for generating one or more common query tag values, a common query tag value corresponding a block of a plurality of instructions read in parallel, different instructions within said block having respective offset positions within said block; and prediction storage means for storing branch predictions, said prediction storage means comprising a plurality of prediction storage lines, a prediction storage line having storage for:

a common stored tag value; a plurality of branch predictions in respect of different offset positions associated with said common stored tag value; and a plurality of validity indicators associated with said plurality of branch predictions.

Viewed from a further aspect the present disclosure provides a method of branch prediction comprising:

generating one or more common query tag values, a common query tag value corresponding a block of a plurality of instructions read in parallel, different instructions within said block having respective offset positions within said block; and storing a plurality of prediction storage lines, a prediction storage line having storage for:

a common stored tag value; a plurality of branch predictions in respect of different offset positions associated with said common stored tag value; and a plurality of validity indicators associated with said plurality of branch predictions.

The above, and other objects, features and advantages of this disclosure will be apparent from the following detailed description of illustrative embodiments which is to be read in connection with the accompanying drawings.

DRAWINGS

FIG. 1 schematically illustrates a portion of the data processing system including a branch predictor;

FIG. 2 schematically illustrates the branch predictor of FIG. 1 in more detail;

FIG. 3 schematically illustrates a first example prediction storage line;

FIG. 4 schematically illustrates a second example prediction storage line;

FIG. 6 is a diagram schematically illustrating a prediction read operation;

FIG. 7 is a diagram schematically illustrating partial allocation operation; and FIG. 8 is a diagram schematically illustrating full allocation operation.

EMBODIMENTS

Figure 1:
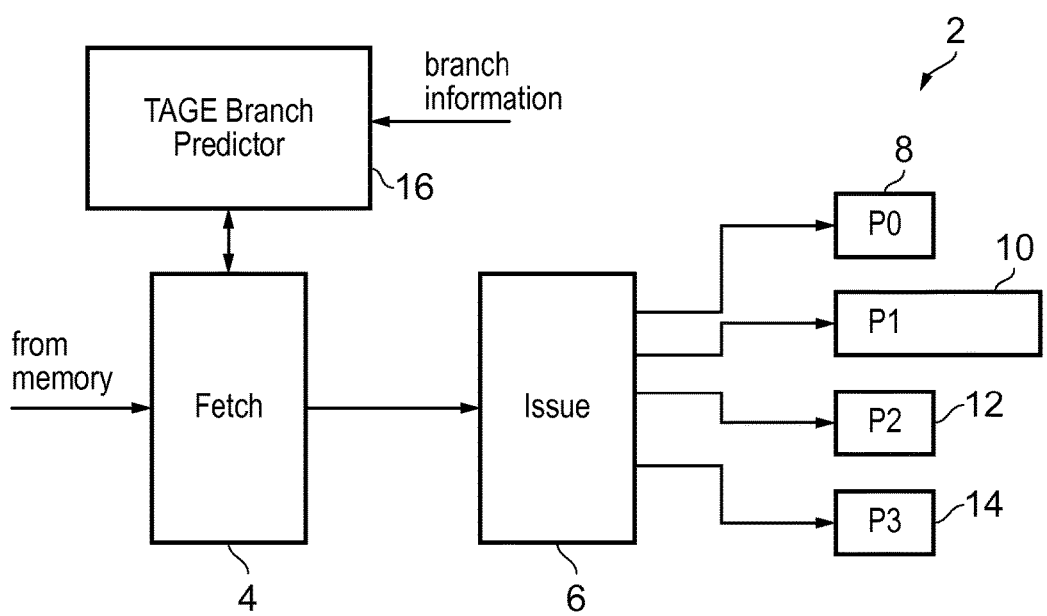

FIG. 1 schematically illustrates a data processing system 2 including fetch circuitry 4 for fetching program instructions from a memory and supplying these to issue circuitry 6. The issue circuitry 6 issues the program instructions for execution into a respective one of a plurality of execution pipelines 8, 10, 12, 14. A branch predictor 16 coupled to the fetch circuitry 4 serves to perform branch predictions based upon branch information representing previous branch behavior (such as branch outcomes, branch addresses, system status when a branch occurred, etc) in order to direct the fetching of program instructions from memory. When a predicted taken branch is encountered, then program instructions are fetched from the branch target and the assumed program flow follows the branch target. The issue circuitry 6 issues the program instructions into the execution pipelines 8, 10, 12, 14 in accordance with the assumed program flow.

In the example illustrated, the branch predictor 16 is a tagged geometric length (TAGE) branch predictor. Such a branch predictor utilizes a plurality of prediction tables indexed in dependence upon history values of respective different lengths with predictions from the plurality of prediction tables being combined to form an output prediction (e.g. in accordance with a hierarchy of the prediction tables, voting between the predictions, etc.). The fetch circuitry 4 fetches multiple program instructions (e.g. a block of $2^x$ program instructions, x=1, 2, . . . ) in parallel. The branch predictor 16 serves to generate in parallel a plurality of branch predictions in respect of the parallel fetched program instructions. As an example, the fetch circuitry may fetch four program instructions each cycle and the branch predictor 16 generate up to four corresponding branch predictions in a cycle. The need to generate multiple branch predictions in parallel while maintaining prediction accuracy has a tendency to require a larger and more complex branch predictor 16, which in turn may be detrimental to price, power consumption and area consumption of the data processing system 2. In some data processing systems, the branch predictor 16 may comprise a relatively large proportion of the total circuit area and contribute a corresponding amount to the cost, complexity and power consumption of the system.

Figure 2:
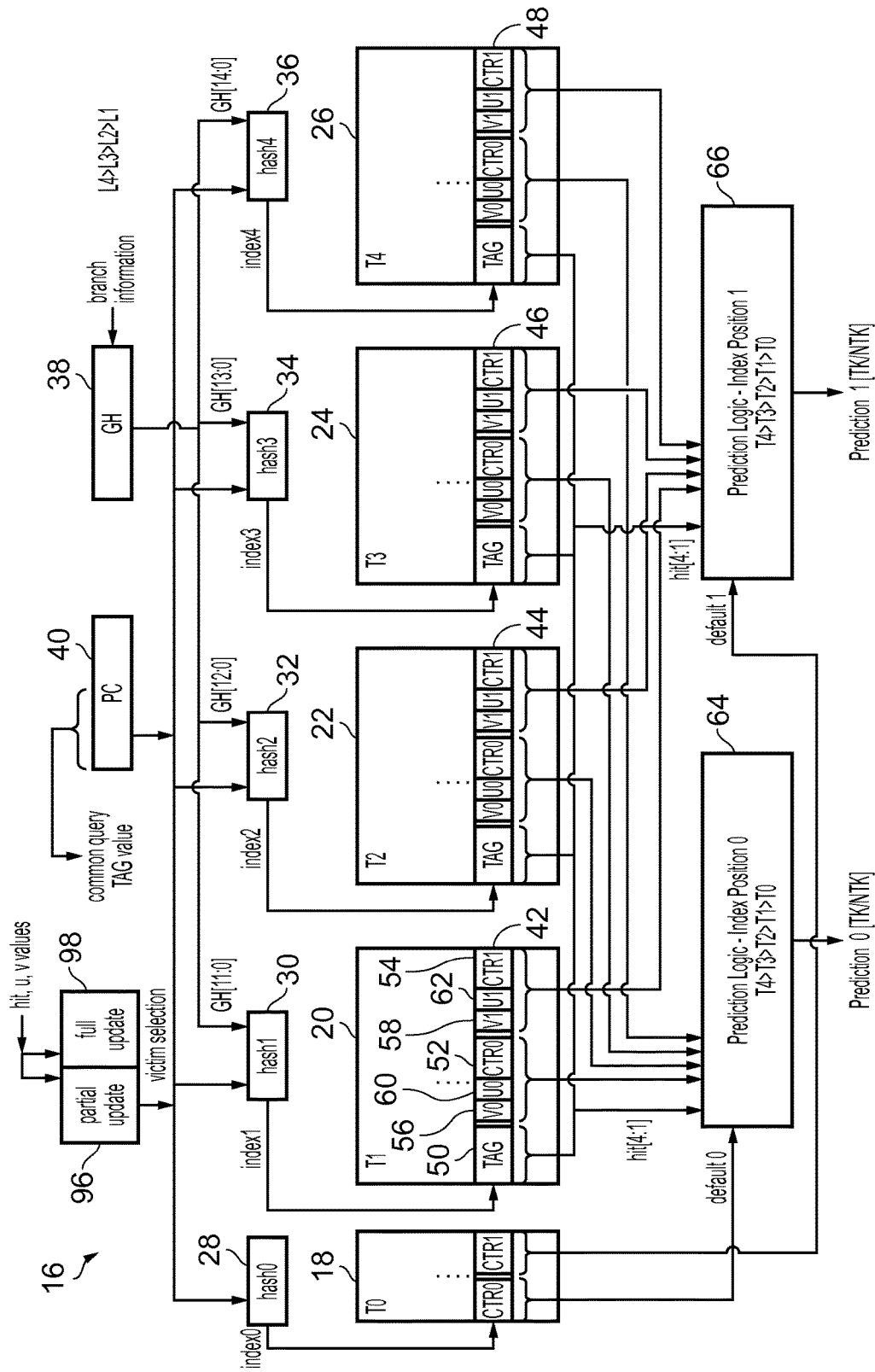

FIG. 2 schematically illustrates an example of the branch predictor 16. The branch predictor 16 includes a plurality of prediction tables 18, 20, 22, 24, 26 indexed with respective index values (index0, index1, index2, index3, index4) generated by respective hash circuitry 28, 30, 32, 34, 36 in dependence upon history values of different lengths GH read from a global history register 38. The global history register 38 stores a branch history value GH which represents a concatenation of previous branch characteristics, such as branch outcomes, branch addresses, the status of the system when a branch occurred, etc. The different hash circuits 28, 30, 32, 34, 36 generate their respective index values in dependence upon the current program counter value PC (read from a program counter register 40) representing the block of a plurality of instructions that have been read in parallel, together with different length portions of the global history value. As an example, the index value (index 4) supplied to the prediction table 26 is generated by the hash circuitry 36 in dependence upon a hash of the program counter value PC and bits extending from bit position zero (representing the most recent history) to bit position 14 of the global history value GH. The other hash circuits which generate index values dependent upon the global history value, namely hash circuits 30, 32, 34 respectively use shorter length sections of the global history value GH as part of their hash function. The hash circuit 28 for the prediction table 18 does not depend upon the global history value GH. The prediction table 18 is used to generate a default prediction should a hit not be found in any of the other prediction tables 20, 22, 24, 26.

Each of the prediction tables 20, 22, 24, 26 stores a plurality of prediction storage lines 42, 44, 46, 48. Each of these prediction storage lines 42, 44, 46, 48 stores a common stored TAG value 50 and a plurality of branch predictions 52, 54 in respect of different offset positions associated with the common stored TAG value 50 and corresponding to different offset positions within a block of program instructions fetched in parallel. Furthermore, each of the branch predictions 52, 54 has an associated validity indicator 56, 58 indicating whether or not the corresponding branch prediction 52, 54 is or is not valid within that prediction line. The validity indicators may be one bit validity flags. The branch predictions 52, 54 may also have associated usefulness values 60, 62 indicative of how often that branch prediction has been accessed as a consequence of a hit between the common query TAG value generated from the program counter value (by TAG generation circuitry, such as a portion of the program counter register 40) and the common stored TAG value 50 for that prediction storage line.

In operation, a current program counter value PC and global history value GH are used to generate respective index values to identify a prediction storage line within each of the prediction tables 18, 20, 22, 24, 26. Within those prediction storage lines having common stored tag values (i.e. excluding the default prediction table 18), the one TAG value stored at the indexed prediction storage line is compared with the common query TAG value derived from the address associated with the current block of program instructions that are being read in parallel. For an example, a field of bits taken from a most significant bit end of the memory address of the block of program instructions may be used to form the common query TAG value and this compared with the common stored TAG value 50 for each of the branch prediction storage lines which are indexed in respective prediction tables 20, 22, 24, 26.

When a hit occurs between the common query TAG value and the common stored TAG value, then this hit is notified as a hit signal to prediction selection circuitry 64, 66 provided in respect of each offset position within the block of program instructions read in parallel. For example, if two program instructions are read in parallel, then there will be two offset positions within that block of two program instructions and two predictions need to be generated in parallel. This is the example illustrated in FIG. 4. It will be appreciated that different numbers of predictions may be generated in parallel depending on the number of offset positions within the block of program instructions read in parallel. For example, if the program instructions are read in blocks of four program instructions, then up to four predictions may be generated in parallel.

The prediction selection circuitry 64, 66, identifies which of the prediction tables (prediction storage circuitry) 20, 22, 24, 26 has notified a hit between the common query TAG value and the common stored TAG value and combines this with an indication of whether or not the branch prediction for the offset position associated with that prediction selection circuitry 64, 66 indicates that the branch prediction is valid. If a hit occurs, and the branch prediction for the offset position concerned is valid, then the prediction from that table is valid. As previously mentioned, the branch predictor 16 operates as a tagged geometric length (TAGE) branch prediction apparatus and accordingly when multiple predictions are found for a given program instruction, then the prediction which is output from the prediction selection circuitry 64, 66 is selected in accordance with a predetermined scheme, such as giving the different prediction tables 20, 22, 24, 26 different priorities, voting or the like. In one example embodiment, predictions generated from bits associated with index values generated in dependence upon longer (more detailed) global history values are preferentially selected over those associated with shorter (less detailed) global history values. The prediction generated may be a taken prediction TK or a not taken prediction NTK. When a hit occurs, then the usefulness value U associated with the valid prediction may be incremented. The branch prediction values may be counter values CTR which indicate, for example, whether the prediction is strongly taken, weakly taken, weakly not taken or strongly not taken. Such counter values CTR may be saturating counters.

FIG. 3 schematically illustrates use of a prediction storage line containing two branch predictions. These branch predictions share a common stored TAG value 50. The common query TAG value, together with the common stored TAG value 50 are supplied to a comparator 68. The output from the comparator 68 is supplied as one input to respective AND gates 70, 72 which take as their other input the valid flag 56, 58 from respective offset positions of the prediction storage line. If the TAG values match and the valid bit indicates validity of the branch prediction concerned, then a hit is generated in respect of the offset position concerned.

FIG. 4 illustrates a prediction storage line containing four branch predictions. In this case the prediction storage line again stores a common stored TAG value 74. Each of the branch predictions for the respective offset positions associated with the common stored TAG value 74 have their own validity flags V0, V1, V2, V3 together with their own usefulness values U0, U1, U2, U3. The predictions themselves may again be counter values CTR0, CTR1, CTR2, CTR3.

Figure 5:
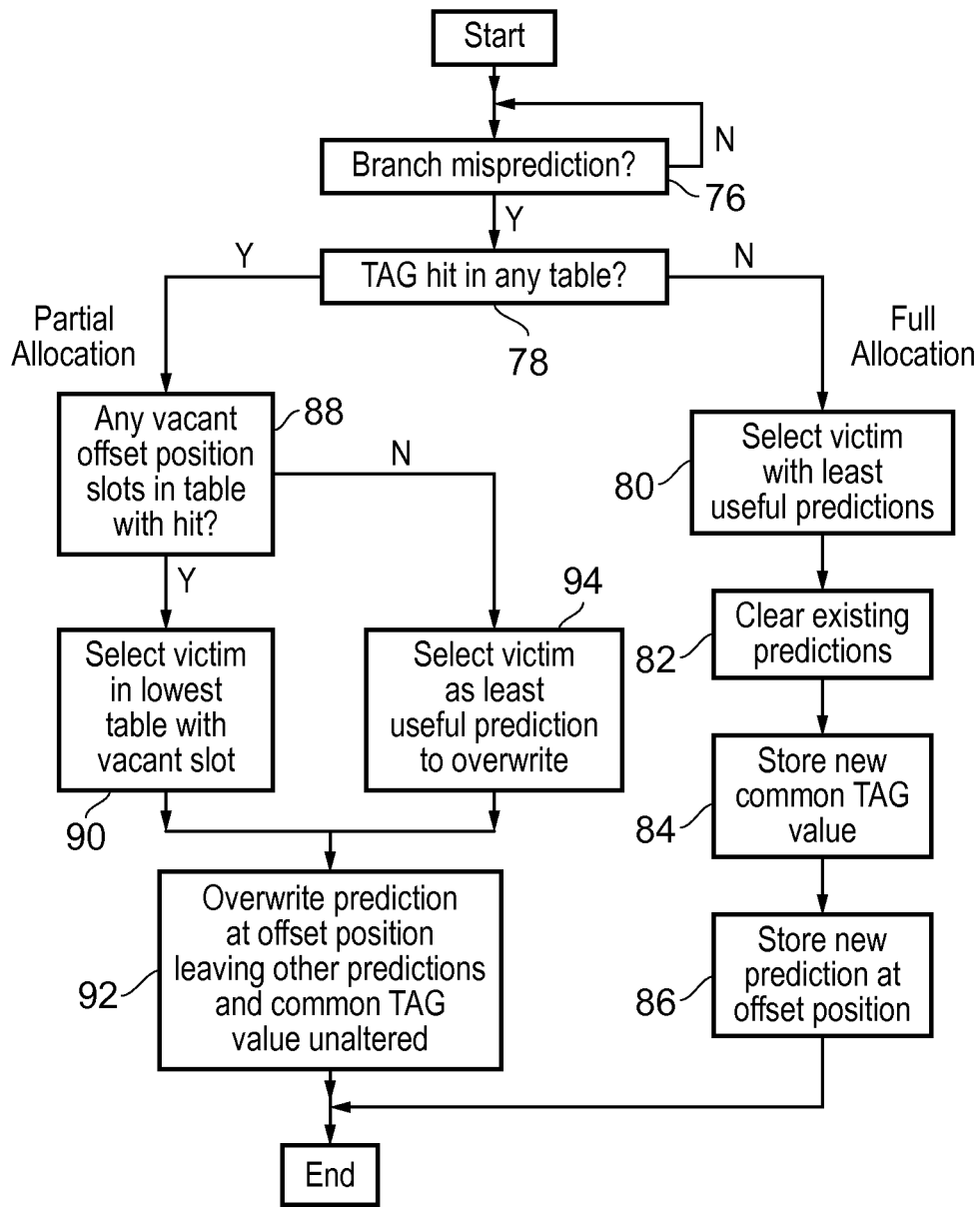
FIG. 5 is a flow diagram schematically illustrating partial allocation and full allocation mechanisms within the branch predictor.

FIG. 5 is a flow diagram schematically illustrating how branch predictions are allocated into the prediction tables 20, 22, 24, 26 when a branch misprediction occurs and a new branch prediction is stored. The processing illustrated in FIG. 5 may be performed by full-allocation-update circuitry 98 and partial-allocation-update circuitry 96. At step 76 a determine is made as to whether or not a branch misprediction has occurred. If a branch prediction has occurred, then step 78 determines whether or not the common query TAG value associated with that branch misprediction matches any common stored TAG value already stored within any of the prediction tables. If there is no such match at step 78, then a full allocation process is followed and step 80 serves to select as a victim the prediction storage line indexed as one of the candidates to store the new prediction data that has the least useful predictions as indicated by its stored usefulness values. Step 82 then clears all the existing predictions from this victim storage line. Step 84 stores the new common stored TAG value into the victim storage line and step 86 stores the new prediction at the relevant offset position within that victim storage line. The other offset positions within the victim storage line will initially have their valid flags set to indicate that they are not storing valid predictions.

If the determination at step 78 is that there is a match, then a partial allocation process is followed. The hit indicates that there is already a prediction storage line with the same common stored TAG value that is to be associated with the new branch prediction which is to be stored. It is not necessary to discard the other branch predictions which are stored within such a prediction storage line as the new branch prediction associated with the misprediction need only be stored at one offset position within the prediction storage line. Step 88 determines whether there are any vacant offset position slots in a prediction table with a hit for the TAG values and that correspond to the offset position of the branch misprediction. If there are any such vacant offset positions available within one of the prediction storage lines which hits, then step 90 serves to select as the victim storage line, the lowest table within the prediction storage tables 20, 22, 24, 26 that has such a vacant slot, i.e. prediction table 20 is selected in preference over prediction table 22 and so forth. Step 92 then serves to write the prediction associated with the branch misprediction into the victim storage line at the offset position concerned, leaving the common stored TAG value and overwriting any valid prediction already present at that offset position. In the case of processing arriving at step 92, via step 90, the slot concerned will be vacant and accordingly, no overwriting of a valid prediction is necessary and instead the new branch prediction is simply stored into a vacant slot and marked as valid. If the determination at step 88 is that there are no suitable vacant offset positions within a table having a TAG hit, then step 94 serves to select as a victim storage line the storage line containing a prediction to be overwritten which has associated with it a usefulness value indicating that it is the least useful of any candidate branch predictions to be overwritten. Processing then proceeds to step 92.

The partial allocation and the full allocation illustrated in FIG. 5 are performed under control of partial-allocation-update circuitry 96 and full-allocation-update circuitry 98 which generate the victim selection signal which is supplied to the prediction table 20, 22, 24, 26 to select the victim into which the new prediction is to be stored. It will be appreciated that FIG. 5 illustrates only one example of how victim selection may be performed when a new prediction is to be stored by the branch predictor 16.

FIG. 6 schematically illustrates a prediction read. The program counter value associated with the block of program instructions being fetched has address 0xAA. This produces a hit within the prediction tables T1, T2, T3 and T5. Validity flags of the associated branch predictions for respective offset positions indicate that for offset 1 the predictions within tables T1 and T2 are valid. In respect of offset 2, the predictions within tables T2, T3 and T5 are valid. The selection of the prediction which is to be used is the prediction associated with the longest hash value from the global history register which produces a TAG hit and is valid. In the case of offset 1, this is the prediction from table T2. In the case of offset 2, this is the prediction from table T5.

FIG. 7 schematically illustrates partial allocation when a branch misprediction has occurred and a new branch prediction is to be stored. The branch prediction is in this case is associated with the program counter address 0xAA and offset position 2 within a block of program instructions indicated by address 0xAA. As will be seen in FIG. 7, tables T1, T2 and T3 have a matching common stored TAG value. Table T3 has a vacant offset position associated with offset 2. In this example, tables T4 and T5 are not storing and valid predictions at the relevant index position and accordingly could also be candidates for the victim storage line. However, since table T3 is already storing a valid prediction at offset position 1, it is efficient to utilize its unused capacity and fill this with the new prediction associated with the branch prediction. Accordingly, the prediction storage line of table T3 is selected as the victim storage line.

FIG. 8 schematically illustrates a full allocation. Again, the common query TAG value associated with the misprediction is 0xAA. In this case, none of the tables contains a matching common stored TAG value. The table containing the least useful predictions which could be used to store the new prediction is table T3. In this case, the existing valid predictions within table T3 are cleared and the new prediction is stored at offset position 2. The other offset position corresponding to offset 1 within the newly stored prediction storage line is marked as invalid.

It will be appreciated that the above has described the branch prediction apparatus in terms of a tag geometric length (TAGE) branch prediction mechanism. It is possible that the technique of using a common stored TAG value for a plurality of branch predictions to be used in respect of a block of a plurality of instructions read in parallel may be applied to different sorts of branch prediction apparatus.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

I claim:

1. Branch prediction apparatus comprising:
tag generation circuitry to generate one or more common query tag values, a common query tag value corresponding to a block of a plurality of instructions read in parallel, different instructions within said block having respective offset positions within said block; and
prediction storage circuitry comprising a plurality of prediction storage lines, a prediction storage line having storage for:
a common stored tag value; a plurality of branch predictions in respect of different offset positions associated with said common stored tag value;
a plurality of validity indicators associated with said plurality of branch predictions; and a usefulness value indicative of how often any of said plurality of branch predictions within said prediction storage line is used.

2. Branch prediction apparatus as claimed in claim 1, wherein said plurality of validity indicators comprise a plurality of validity flags corresponding to respective branch predictions of a prediction storage line.

3. Branch prediction apparatus as claimed in claim 1, comprising hit signal generation circuitry to generate a plurality of hit signals in respect of different offset positions within said block of program instructions, a hit signal for a given offset position indicating a hit when a common query tag value matches an common stored tag value and a validity indicator is valid for a branch prediction corresponding to said given offset position.

4. Branch prediction apparatus as claimed in claim 1, comprising partial-allocation-update circuitry to select a victim storage line within said prediction storage circuitry for an update branch prediction not stored within said prediction storage circuitry and having an partial-allocation-update tag value and partial-allocation-update offset position, said victim storage line already storing a common stored tag value matching said partial-allocation-update tag value, said partial-allocation-update circuitry:
   storing said update branch prediction as a branch prediction corresponding to said partial-allocation-update offset position within said victim storage line; and
   leaving in place valid branch predictions corresponding to other offset position within said victim storage line.

5. Branch prediction apparatus as claimed in claim 1, comprising full-allocation-update circuitry to select a victim storage line within said prediction storage circuitry for an update branch prediction not stored within said prediction storage circuitry and having an full-allocation-update tag value and full-allocation-update offset position, said victim storage line storing a common stored tag value mismatching said full-allocation-update tag value, said full-allocation-update circuitry:
   storing within said victim storage line said full allocation-update tag value and said update branch prediction as a branch prediction corresponding to said full-allocation-update offset position; and
   setting invalid any branch predictions corresponding to other offset position within said victim storage line.

6. Branch prediction apparatus as claimed in claim 1, wherein said tag generation circuitry generates a plurality of common query tag values corresponding to said block, said prediction storage circuitry comprises a plurality of sets of prediction storage lines, and different common query tag values are matched against common stored tag values within a respective different set of said plurality of sets of prediction storage lines.

7. Branch prediction apparatus as claimed in claim 6, wherein said tag generation circuitry comprises a global branch history register to store a branch history value representing a concatenation of previous branch characteristics and said plurality of common tag values correspond to a function of respective different length portions of said branch history value and a memory address value associated with said block of a plurality of instructions.

8. Branch prediction apparatus as claimed in claim 6, wherein said prediction storage circuitry uses at least a portion of a memory address value associated with said block of a plurality of instructions to index a candidate prediction storage line within each set of prediction storage lines that is a candidate to store a corresponding one of said plurality of common query tag values.

9. Branch prediction apparatus as claimed in claim 8, comprising partial-allocation-update circuitry to select a victim storage line within said prediction storage circuitry for an update branch prediction not stored within said prediction storage circuitry and having an partial-allocation-update tag value and partial-allocation-update offset position, said victim storage line already storing a common stored tag value matching said partial-allocation-update tag value, said partial-allocation-update circuitry:
   storing said update branch prediction as a branch prediction corresponding to said partial-allocation-update offset position within said victim storage line; and
   leaving in place valid branch predictions corresponding to other offset position within said victim storage line; and
   said partial-allocation-update circuitry preferentially selects as said victim storage line a candidate prediction storage line not already storing a valid branch prediction at an offset position corresponding to said update branch prediction.

10. Branch prediction apparatus as claimed in claim 1, wherein a branch prediction comprises a prediction strength value indicative of a prediction confidence level associated with said branch prediction.

11. Branch prediction apparatus as claimed in claim 1, wherein a branch prediction comprises a usefulness value indicative of how often said branch prediction is used.

12. Branch prediction apparatus as claimed in claim 1, comprising a plurality of prediction tables indexed in dependence upon history values of respective different lengths with predictions from said plurality of prediction tables combined to form an output prediction.

13. Branch prediction apparatus as claimed in claim 1, comprising a tagged geometric length branch prediction apparatus.

14. Branch prediction apparatus comprising:
   tag generation means for generating one or more common query tag values, a common query tag value corresponding to a block of a plurality of instructions read in parallel, different instructions within said block having respective offset positions within said block; and
   prediction storage means for storing branch predictions, said prediction storage means comprising a plurality of prediction storage lines, a prediction storage line having storage for:
      a common stored tag value; a plurality of branch predictions in respect of different offset positions associated with said common stored tag value;
      a plurality of validity indicators associated with said plurality of branch predictions; and
      a usefulness value indicative of how often any of said plurality of branch predictions within said prediction storage line is used.

15. A method of branch prediction comprising:
   generating one or more common query tag values, a common query tag value corresponding to a block of a plurality of instructions read in parallel, different instructions within said block having respective offset positions within said block; and
   storing a plurality of prediction storage lines, a prediction storage line having storage for:
      a common stored tag value; a plurality of branch predictions in respect of different offset positions associated with said common stored tag value;
      a plurality of validity indicators associated with said plurality of branch predictions; and a usefulness value indicative of how often any of said plurality of branch predictions within said prediction storage line is used.

* * * * *